(12) United States Patent
Cha et al.

(10) Patent No.: US 11,560,098 B2
(45) Date of Patent: Jan. 24, 2023

(54) VEHICLE ROOF SYSTEM AND METHOD OF CONTROLLING SAME

(71) Applicants: Hyundai Motor Company, Seoul (KR); Kia Motors Corporation, Seoul (KR)

(72) Inventors: Dong Eun Cha, Gyeonggi-do (KR); Jin Ho Hwang, Chungcheongnam-do (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 330 days.

(21) Appl. No.: 17/029,615

(22) Filed: Sep. 23, 2020

(65) Prior Publication Data
US 2021/0380043 A1 Dec. 9, 2021

(30) Foreign Application Priority Data
Jun. 9, 2020 (KR) .......................... 10-2020-0069758

(51) Int. Cl.
*B60R 9/05* (2006.01)
*B60R 9/055* (2006.01)
*B60J 7/043* (2006.01)
*E05F 15/73* (2015.01)
*B60R 9/042* (2006.01)

(52) U.S. Cl.
CPC .............. *B60R 9/055* (2013.01); *B60J 7/043* (2013.01); *B60R 9/042* (2013.01); *E05F 15/73* (2015.01); *E05Y 2900/542* (2013.01); *E05Y 2900/602* (2013.01)

(58) Field of Classification Search
CPC .......... B60R 9/055; B60R 9/04; B60R 9/042; B60R 9/045; B60R 9/048; B60R 9/058; B60J 7/043; E05F 15/73
USPC .................................................. 224/309, 314
See application file for complete search history.

(56) References Cited

U.S. PATENT DOCUMENTS

| | | | |
|---|---|---|---|
| 10,916,151 B2 * | 2/2021 | Mulhall | G08G 5/0013 |
| 11,130,437 B1 * | 9/2021 | Tatro | B60P 3/39 |
| 2015/0298618 A1 * | 10/2015 | Meszaros | B60R 9/045 224/321 |
| 2017/0313421 A1 * | 11/2017 | Gil | B64D 45/04 |
| 2019/0168888 A1 * | 6/2019 | Kim | B64F 1/007 |
| 2020/0361393 A1 * | 11/2020 | Cabaniss | B60R 9/045 |

FOREIGN PATENT DOCUMENTS

KR 2020-0017582 A 2/2020

\* cited by examiner

*Primary Examiner* — Corey N Skurdal
(74) *Attorney, Agent, or Firm* — Fox Rothschild LLP

(57) ABSTRACT

A vehicle roof system and a method of controlling the vehicle roof system are provided. The vehicle roof system includes an opening-closing module that is provided on a roof of a vehicle and a loading module that is provided on the top of the opening-closing module. A locking mechanism is also provided within the loading module. The opening-closing module is slid in one direction or in the opposite direction to open or close the roof. The loading module has a loading space that is separated from an indoor space in the vehicle, with the opening-closing module disposed in between. The locking mechanism supports a weight of a load when in operation for locking and no longer supports the weight of the load when in operation for unlocking.

14 Claims, 4 Drawing Sheets

VEHICLE ROOF SYSTEM AND METHOD OF CONTROLLING SAME

CROSS REFERENCE TO RELATED APPLICATION

The present application claims priority to Korean Patent Application No. 10-2020-0069758, filed Jun. 9, 2020, the entire contents of which is incorporated herein for all purposes by this reference.

BACKGROUND

Field of the Disclosure

The present disclosure relates to a vehicle roof system through which an external delivery apparatus, such as a drone, delivers loads to a roof carrier of a vehicle or picks up loads from the roof carrier, thereby enabling loads to be conveniently transferred between the external delivery apparatus and the vehicle without requiring the driver to exit the vehicle and even without requiring the vehicle to stop traveling. The present disclosure also relates to a method of controlling the vehicle roof system.

Description of the Related Art

In recent years, autonomous vehicles have been under development. The autonomous vehicles provide driver convenience and a comfortable environment for riding in a vehicle for a long time, and thus the autonomous vehicles are recognized as mobile living spaces as well as efficient means of transportation. In addition, drones find applications in a wide range of fields. Unmanned delivery systems using a drone have been under development and have been deployed for testing.

However, unmanned systems for delivery to a vehicle using a drone have not yet been proposed. The concept of delivery from a drone to a vehicle has not been introduced. Autonomous vehicles have grown in popularity and use. People are expected to spend more time in riding in autonomous vehicles that may be utilized as mobile living spaces as well as efficient means of transportation.

For this reason, there will be an increasing need to deliver an object directly to the autonomous vehicle. Technologies for the unmanned delivery system for delivery from a drone to a vehicle will increase the utility of the vehicle. The possible connection of the vehicle to the outside world will create various new services. Accordingly, there is a need for an interface for more easily transferring a thing to or from the outside when the vehicle stops or while the vehicle travels.

The foregoing is intended merely to aid in understanding the background of the present disclosure and therefore should not be interpreted to admit that the present disclosure falls within the purview of the related art that is already known to a person of ordinary skill in the art.

SUMMARY

An objective of the present disclosure is to provide a vehicle roof system through which an external delivery apparatus, such as a drone, delivers a load to a roof carrier of a vehicle and through which the load may be transferred into an internal space of the vehicle, thereby making it possible to conveniently deliver the load into the vehicle without an occupant exiting the vehicle to pick up the load or while the vehicle travels, and a method of controlling the vehicle roof system.

An aspect of the present disclosure provides a vehicle roof system that may include: an opening-closing module provided on a roof of a vehicle, the opening-closing module being slid in one direction or in the opposite direction to open or close the roof; a loading module disposed on the top of the opening-closing module, the loading module having a loading space that is separated from an indoor space in the vehicle, with the opening-closing module disposed in between; and a locking mechanism disposed within the loading module, the locking mechanism supporting a weight of a load when in operation for locking and no longer supporting the weight of the load when in operation for unlocking.

The vehicle roof system may further include a controller configured to operate the opening-closing module and the locking mechanism in such a manner that the load is placed in the loading module or is transferred into the indoor space in the vehicle. In the vehicle roof system, the opening-closing module may be a sunroof of the vehicle, and the loading module may be a roof carrier mounted on the roof of the vehicle. In addition, the opening-closing module may include a plurality of panels, and when the locking mechanism is opened, a panel on a first side may be slid toward a panel on a second side in an overlapping manner, thereby forming an opening.

The vehicle roof system may further include a door provided underneath the loading module, in which, when the opening-closing module is opened, the door may be opened, and the load within an internal space in the loading module may be transferred into an internal space in the vehicle through the opening-closing module and the door that are opened. In the vehicle roof system, the loading module may have a support panel inside, the support panel may be slid within the loading module, and the load may be supported on the support panel within the loading module.

When the opening-closing module is opened, the support panel may be slid and thus the load may be exposed toward the indoor space in the vehicle, and when the locking mechanism unlocks the load, the load may be transferred into the indoor space in the vehicle. The vehicle roof system may further include a cover provided on the top of the loading module, wherein, when the cover is opened, an internal space in the loading module may be exposed in the upward direction.

In the vehicle roof system, when receiving a delivery request from a drone, a controller may be configured to perform a control to pen the cover for the drone to deliver the load into the internal space in the loading module. In the vehicle roof system, when the drone completes the delivery, the controller may be configured to perform a control to close the cover. When the delivered load needs to be transferred within the vehicle, the controller may be configured to operate the opening-closing module to be opened and operate the locking mechanism to unlock the delivered load, thereby transferring the delivered load into an internal space in the vehicle.

Another aspect of the present disclosure provides a method of controlling the vehicle roof system that may include: sliding the opening-closing module for opening; and causing the locking mechanism to unlock the load and thus transferring the load from the loading module into an internal space in the vehicle. The method may further include recognizing a position of the load within the loading module, in which, in sliding the opening-closing module for opening, a support panel of the opening-closing module may be slid for opening, the support panel corresponding to a position where the load is positioned.

In the method, in causing the locking mechanism to unlock the load and transferring the load from the loading module into the internal space in the vehicle, the load in a specific position may be unlocked. Additionally, in recognizing the position of the load within the loading module, the position of the load may be recognized with a change in a weight of a support panel of the opening-closing module.

With the vehicle roof system and the method of controlling the vehicle roof system according to the present disclosure, an external delivery apparatus, such as a drone, delivers a load to a roof carrier of a vehicle, and the load may be transferred into an internal space in the vehicle. Thus, the vehicle may conveniently receive the load from the outside without an occupant exiting the vehicle to pick up the load or while the vehicle travels.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present invention, and wherein.

DETAILED DESCRIPTION

Figure 1:
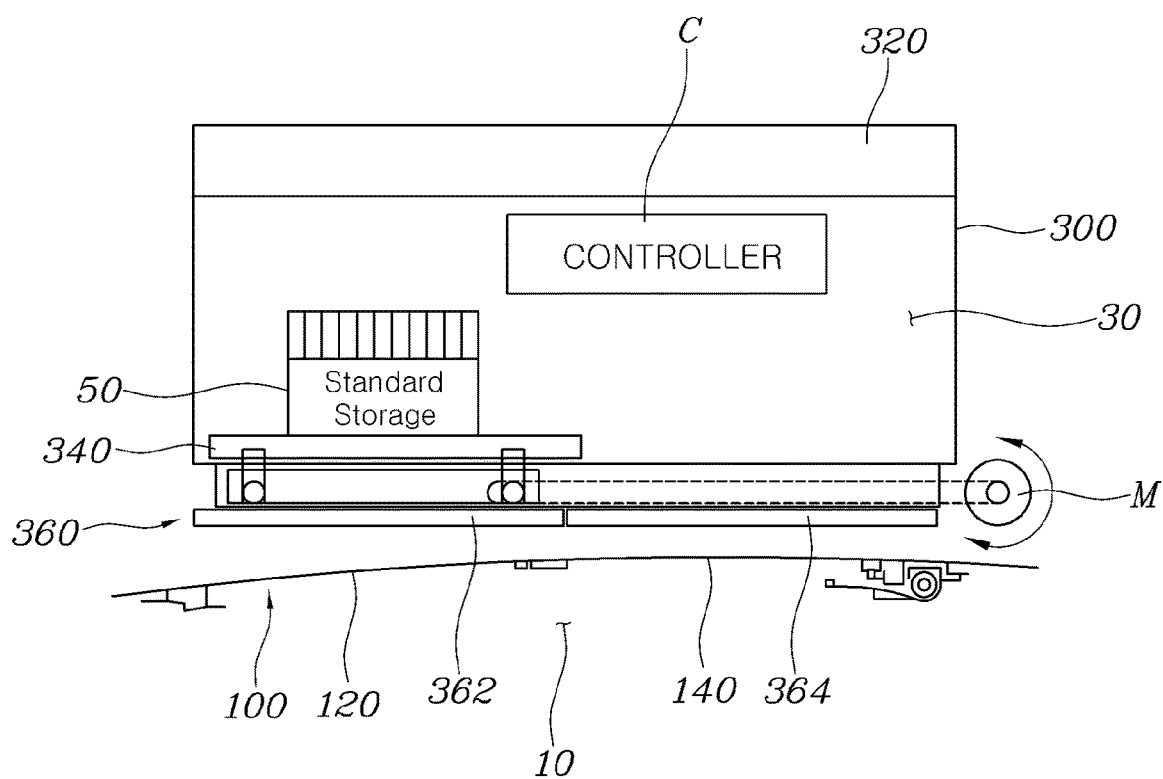
FIGS. 1 and 2 are diagrams each illustrating how a vehicle roof system according to an exemplary embodiment of the present disclosure transfers a load.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
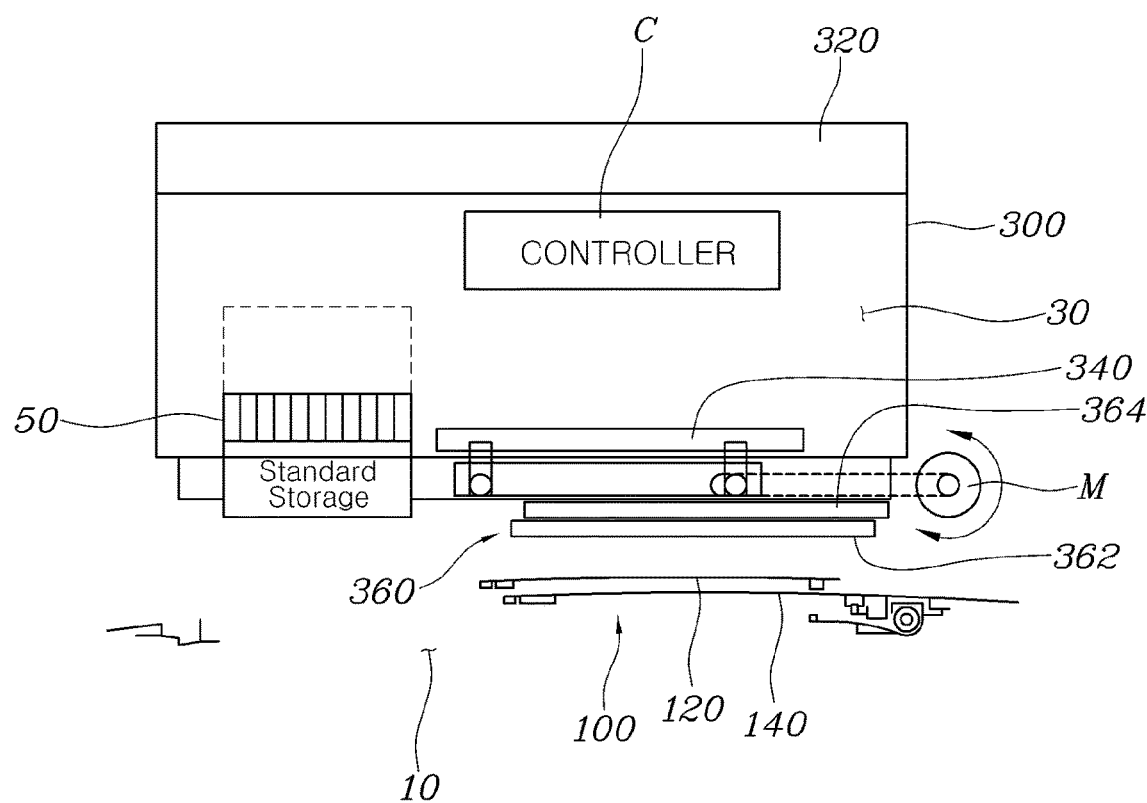

With reference to FIGS. 1 and 2, the vehicle roof system according to the exemplary embodiment of the present disclosure may include an opening-closing module 100, a loading module 300, and a locking mechanism 500. Each of the components may be operated by an overall controller within the vehicle. In particular, the opening-closing module 100 mounted on a roof of a vehicle may slide in a first direction or in a second direction (opposite to the first) to open or close the roof of the vehicle. The loading module 300 disposed on the top of the opening-closing module 100 has a loading space 30 that is separated from an indoor space 10 in the vehicle, with the opening-closing module 100 disposed in between. The locking mechanism 500 disposed within the loading module 300 supports a weight of a load 50 when in operation for unlocking and no longer supports the weight of the load 50 when in operation for unlocking.

According to the present disclosure, it may be possible that the vehicle transfers an object (e.g., package, load, or something similar) to or from the outside. Accordingly, the roof of the vehicle requires a space into which to place the object. The load may be received through the roof of the vehicle and may be transferred into the indoor space in the vehicle. This increases the efficiency with which the internal space is utilized. Particularly, a drone carrying a load may place the load on the roof of the vehicle that is the most suitable for delivery to the vehicle.

Specifically, the vehicle roof system according to the present disclosure may include the opening-closing module 100. The opening-closing module 100 may be disposed on the roof of the vehicle. The opening-closing module 100 may slide in a first direction or in a second direction (e.g., opposite to the first direction) to open or close the roof. It may be possible that a sunroof of the vehicle is utilized as the opening-closing module 100. The sunroof may include a plurality of panels. When closed, the sunroof serves as a roof of the vehicle. When opened, the sunroof provides an opening through which the load 50 is to be delivered.

In addition, the loading module 300 may be disposed on the top of the opening-closing module 100 and has a loading space 30 and may be separated from the indoor space 10 in the vehicle, with the opening-closing module 100 disposed in between. The loading module 300 may be a roof carrier provided separately on the top of the roof of the vehicle or be a roof carrier combined integrally with the roof of the vehicle. When the loading module 300 is provided separately on the roof, a sunroof may be provided as the opening-closing module 100 for the vehicle, and the loading module 300 may include a door 360 provided at the bottom thereof. When the loading module 300 is combined integrally with the roof of the vehicle, only the opening-closing module 100 on the roof is necessary, and the separate door 360 may be unnecessary. In other words, in this case, only the opening-closing module 100 is opened, and thus the indoor space 10 in the vehicle and the loading space 30 in the loading module 300 may communicate directly with each other.

In addition, the locking mechanism 500 may be disposed within the loading module 300. When in operation for locking, the locking mechanism 500 supports the weight of the load 50. When in operation for unlocking, the locking mechanism no longer supports the weight of the load 50. In other words, when in operation for locking, the locking mechanism 500 supports the weight of the load 50 in such a manner that the load 50 is held in place within the loading space 30 in the loading module 300. When in operation for unlocking, the locking mechanism 500 no longer supports the weight of the load 50 in such a manner that the load 50 falls into an open space. Thus, it may be possible that the load 50 is transferred into the internal space in the vehicle.

Then, the controller C may be configured to operate the opening-closing module 100 and the locking mechanism 500 to place the load 50 in the loading module 300 or to transfer the load 50 into the indoor space 10 in the vehicle. More specifically, the controller C may be configured to operate actuators M that drive the opening-closing module 100 and the locking mechanism 500, respectively. The controller C may be configured to receive information from different sensors that are additionally necessary, and according to the received pieces of information, operate various actuators. The controller C may be configured to execute overall control for receiving and transferring the load. A method of transferring motive power through a wire or the like applies to the actuator M.

The controller C according to an exemplary embodiment of the present disclosure may be realized through a non-volatile memory (not illustrated) and a processor (not illustrated). Stored in the nonvolatile memory are algorithms for executing operations of various components of the vehicle or pieces of data as to software commands for executing the algorithms. The processor may be configured to perform operations that will be described below, using pieces of data stored in the nonvolatile memory. The memory and the processor are realized as individual chips. Alternatively, the memory and the processor may be realized as a single integrated chip. The processor may be a combination of two or more processors.

The opening-closing module 100 may be a sunroof of the vehicle, and the loading module 300 may be a roof carrier mounted on the sunroof of the vehicle. The opening-closing module 100 may include a plurality of panels, for example, panels 120 and 140. When the opening-closing module 100 is opened, panels 120 on a first side may slide toward the panel 140 on a second side (e.g., an opposite side to the first side) in an overlapping manner, thereby forming an opening. The loading module 300 may include a door 360 provided at the bottom thereof. When the opening-closing module 100 is opened, the door 360 may be opened. The load within an internal space in the loading module 300 may be transferred into the internal space in the vehicle through the door 360 and the opening-closing module 100 that are both opened. In this manner, in a vehicle that is not equipped with the loading module 300, the opening-closing module 100 operates as a general sunroof. In a vehicle that is equipped with the loading module 300, the opening-closing module 100 that is a sunroof operates as a path along which to transfer a thing.

The loading module 300 may include the support panel 340 inside. The support panel 340 may slide within the loading module 300. The load 50 may be supported on the support panel 340 within the loading module 300. Normally, the load 50 is placed stably on the support panel 340 within the loading module 300. The load 50 may be stably transferred to or from a drone.

When the opening-closing module 100 is opened, the support panel 340 may slide. Thus, the load 50 may be exposed toward the indoor space 10 in the vehicle. When the locking mechanism 500 unlocks the load 50, the load 50 may be transferred into the indoor space 10 in the vehicle. In other words, the load 50 may be fundamentally supported on the support panel 340, but may be supported on a separate locking mechanism 500. Therefore, although the support panel 340 slides, the locking mechanism 500 may finally support the load 50. Accordingly, the load 50 may be prevented from immediately falling into the internal space in the vehicle when the support panel 340 slides.

The loading module 300 may include a cover 320 provided on the top thereof. When the cover 320 is opened, the loading space 30 in the loading module 300 may be exposed in the upward direction. Accordingly, in response to receiving a delivery request from the drone (not illustrated), the controller C may be configured to open the cover 320. Then, the drone may deliver the load 50 into the loading space 30 in the loading module 300. When the drone completes the delivery, the controller C may be configured to close the cover 320. When the delivered load 50 needs to be transferred within the vehicle, the controller C may be configured to operate the opening-closing module 100 to be opened and operate the locking mechanism 500 to unlock the delivered load 50, thereby transferring the delivered load 50 into the indoor space 10 in the vehicle.

Figure 3:
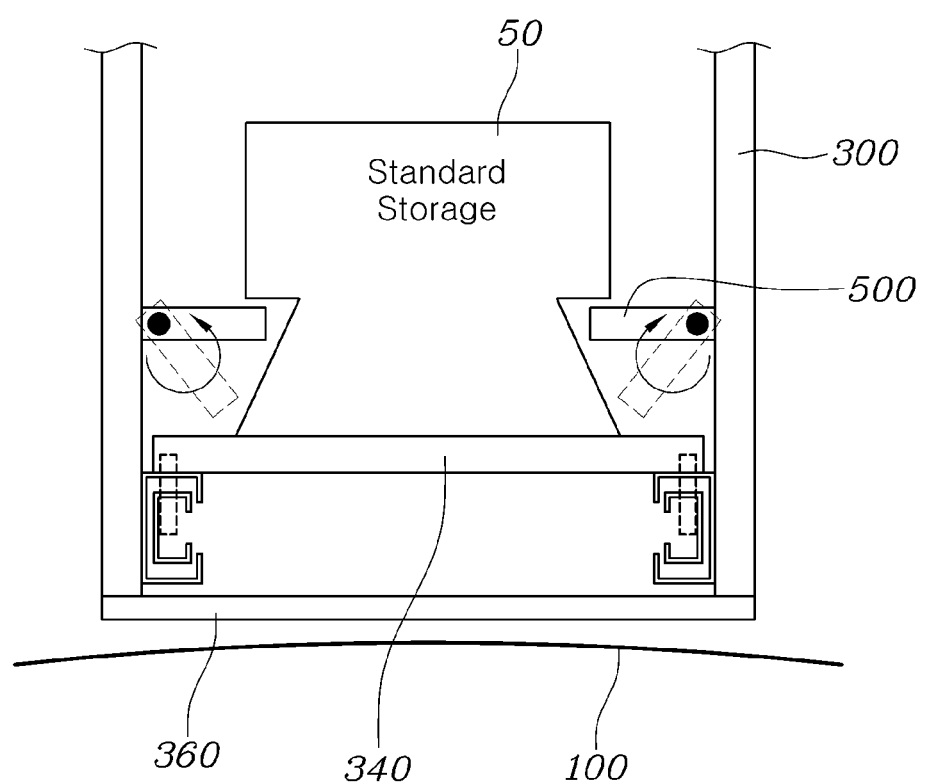
FIG. 3 is a cross-sectional diagram illustrating the vehicle roof system according to the exemplary embodiment of the present disclosure.

FIGS. 1 and 2 are diagrams each illustrating how a vehicle roof system according to the exemplary embodiment of the present disclosure transfers a load. FIG. 3 is a cross-sectional diagram illustrating the vehicle roof system according to the exemplary embodiment of the present disclosure.

Although not illustrated, while approaching the vehicle, a drone carrying a load may communicate with the controller C of the vehicle or an external server and may be configured to transmit a signal indicating that the load 50 is to be transferred to the vehicle. According to this signal, the controller C of the vehicle may be configured to open the cover 320, and the drone may safely place the load 50 on the support panel 340 within the loading module 300. The locking mechanism 500 may be configured to lock the load 50 and close the cover 320. In this manner, the load 50 may be placed within the loading module 300. FIG. 1 illustrates this state. The controller C may be configured to measure a weight of the support panel 340 and thus detect a position where the load 50 is placed.

When the load 50 needs to be transferred into the indoor space 10 in the vehicle, the controller C may be configured to first open the opening-closing module 100. Since the controller C has already detected that the load 50 is placed on one side 120 (e.g., a first side) of the opening-closing module 100, not on the opposite side 140 (e.g., a second side) thereof, the controller C may be configured to operate such that the first side 120 is slid toward the second side 140, thereby forming an opening. Likewise, the controller C may be configured to operate such that the one side 362 (e.g., first side) of the door 360 is also slid toward the opposite side 364 (e.g., second side) thereof. The controller C may be configured to operate such that the support panel 340 is also slid in the opposite direction (e.g., second direction). Accordingly, when the locking mechanism 500 locks the load 50, the load 50 may be supported on the locking mechanism 500 and, at the same time, may be exposed toward the indoor space 10 in the vehicle that is positioned under the load 50.

In this state, as illustrated in FIG. 3, when the controller C rotates the locking mechanism 500 and operates the locking mechanism to unlock the load 50, the load 50 is no longer supported and falls downward. Of course, a separate transfer mechanism that safely receives the load 50 falling from above and transfers the received load 50 downward may be provided in the indoor space 10 in the vehicle. In particular, the load 50 may be prevented from injuring an occupant, and convenience of the occupant may be increased.

Figure 4:
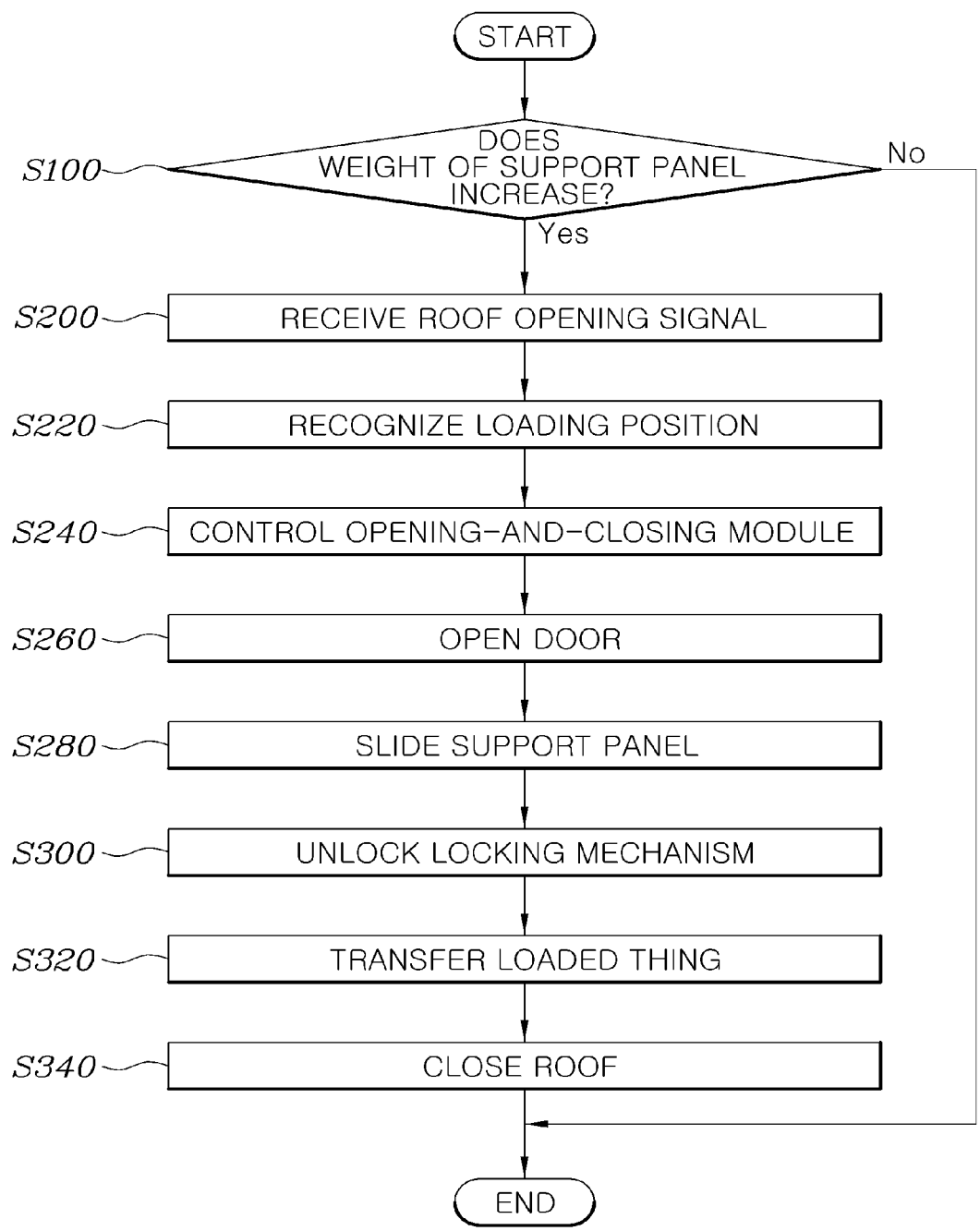
FIG. 4 is a flowchart illustrating a method of controlling the vehicle roof system according to an exemplary embodiment of the present disclosure.

FIG. 4 is a flowchart illustrating a method of controlling the vehicle roof system according to the exemplary embodiment of the present disclosure. The method described herein may be executed by an overall controller of the system. The method may include a step S240 of sliding an opening-closing module for opening, and a step S300 of causing a locking mechanism to unlock a load and transferring the load from a loading module into an internal space in a vehicle.

First, a controller may be configured to detect that a weight of a support panel increases (S100). Then, the controller may be configured to measure the weight and detect a position of the load within the loading module. In response to receiving a roof opening signal, the controller may be configured to detect a loading position of the load and cause a support panel of the opening-closing module, which corresponds to the loading position of the load, to be slid for opening (S200 and S220). In particular, a portion of the opening-closing module, which corresponds to a position where the load is positioned may be slid for opening (S240). A door corresponding to the opening-closing module may be opened (S260). The support panel may be slid and the load may be exposed toward the indoor space in the vehicle that is positioned under the load (S280).

In the step S300 of causing the locking mechanism to unlock the load and transferring the load from the loading module into the internal space in the vehicle, the locking mechanism may be caused to unlock the load in a specific position (S320). Thus, only a necessary load may be transferred into the indoor space in the vehicle that is positioned under the necessary load. When the transferring of the load is finished, control that closes the roof of the vehicle may be performed (S340).

With the vehicle roof system and the method of controlling the vehicle roof system according to the present disclosure, an external delivery apparatus, such as a drone, may deliver a load to a roof carrier of a vehicle or picks up a load from the roof carrier of the vehicle. Thus, the vehicle may conveniently receive the load from the outside or transmit the load to the outside without requiring an occupant to exit the vehicle and even without requiring the vehicle to stop traveling.

The specific exemplary embodiments of the present disclosure are illustrated and described, and it will be obvious to a person of ordinary skill in the art that various modifications and alterations are possibly made to the present disclosure without departing from the technical idea of the present disclosure that is claimed in the following claims.

What is claimed is:

1. A vehicle roof system, comprising:
    an opening-closing module provided on a roof of a vehicle, the opening-closing module being slid in a first direction or in a second direction to open or close the roof;
    a loading module provided on the top of the opening-closing module, the loading module having a loading space that is separated from an indoor space in the vehicle, with the opening-closing module disposed in between; and
    a locking mechanism provided within the loading module, the locking mechanism supporting a weight of a load when in operation for locking and no longer supporting the weight of the load when in operation for unlocking.

2. The vehicle roof system according to claim 1, further comprising:
    a controller configured to operate the opening-closing module and the locking mechanism to place the load in the loading module or to transfer the load into the indoor space in the vehicle.

3. The vehicle roof system according to claim 1, wherein the opening-closing module is a sunroof of the vehicle, and the loading module is a roof carrier mounted on the roof of the vehicle.

4. The vehicle roof system according to claim 1, wherein the opening-closing module includes a plurality of panels, and when the locking mechanism is opened, a panel on a first side is slid toward a panel on a second side in an overlapping manner to form an opening.

5. The vehicle roof system according to claim 1, wherein the loading module includes a door provided at the bottom thereof, and wherein when the opening-closing module is opened, the door is opened, and the load within an internal space in the loading module is transferred into an internal space in the vehicle through the opening-closing module and the door that are opened.

6. The vehicle roof system according to claim 1, wherein the loading module has a support panel inside, the support panel is slid within the loading module, and the load is supported on the support panel within the loading module.

7. The vehicle roof system according to claim 6, wherein when the opening-closing module is opened, the support panel is slid and the load is exposed toward the indoor space in the vehicle, and when the locking mechanism unlocks the load, the load is transferred into the indoor space in the vehicle.

8. The vehicle roof system according to claim 1, wherein the loading module includes a cover provided on the top thereof, and wherein, when the cover is opened, an internal space in the loading module is exposed in the upward direction.

9. The vehicle roof system according to claim 8, wherein when receiving a delivery request from a drone, a controller is configured to open the cover for the drone to deliver the load into the internal space in the loading module.

10. The vehicle roof system according to claim 9, wherein when the drone completes the delivery, the controller is configured to close the cover, and when the delivered load needs to be transferred within the vehicle, the controller is configured to open the opening-closing module and operate the locking mechanism to unlock the delivered load to transfer the delivered load into an internal space in the vehicle.

11. A method of controlling the vehicle roof system according to claim 1, comprising:
   sliding the opening-closing module for opening; and
   operating the locking mechanism to unlock the load and transferring the load from the loading module into an internal space in the vehicle.

12. The method according to claim 11, further comprising:
   detecting a position of the load within the loading module, wherein in sliding the opening-closing module for opening, a support panel of the opening-closing module is slid for opening, the support panel corresponding to a position where the load is positioned.

13. The method according to claim 12, wherein, in operating the locking mechanism to unlock the load and transferring the load from the loading module into the internal space in the vehicle, the locking mechanism is operated to unlock the load in a specific position.

14. The method according to claim 12, wherein in detecting the position of the load within the loading module, the position of the load is detected with a change in a weight of a support panel of the opening-closing module.

* * * * *